US006919038B2

United States Patent
Meyer et al.

(10) Patent No.: US 6,919,038 B2
(45) Date of Patent: Jul. 19, 2005

(54) METHOD OF PRODUCING THICK-WALLED BRUSHES, IN PARTICULAR TOOTHBRUSHES

(75) Inventors: Berthold Meyer, Neustadt (DE); Andreas Walgenbach, Buchholz (DE); Armin Seifert, Neuwied (DE)

(73) Assignee: M + C Schiffer GmbH, Neustadt (DE)

( * ) Notice: Subject to any disclaimer, the term of this patent is extended or adjusted under 35 U.S.C. 154(b) by 21 days.

(21) Appl. No.: 10/347,127

(22) Filed: Jan. 17, 2003

(65) Prior Publication Data

US 2003/0135943 A1 Jul. 24, 2003

Related U.S. Application Data

(63) Continuation of application No. PCT/EP01/08204, filed on Jul. 17, 2001.

(30) Foreign Application Priority Data

Jul. 18, 2000 (DE) .......................................... 100 34 839

(51) Int. Cl.[7] .......................... B29C 45/14; B29C 70/72; B29C 70/74
(52) U.S. Cl. .................... 264/36.22; 264/132; 264/243; 264/255; 264/328.8
(58) Field of Search ............................ 264/36.1, 36.22, 264/132, 243, 250, 254, 255, 319, 320, 328.7, 328.8; 300/21; 15/143.1, 167.1

(56) References Cited

U.S. PATENT DOCUMENTS

| 4,444,711 | A | * | 4/1984 | Schad | 264/243 |
| 5,256,048 | A | * | 10/1993 | Jacobs et al. | 425/130 |
| 5,761,759 | A | * | 6/1998 | Leversby et al. | 15/167.1 |
| 6,051,176 | A | * | 4/2000 | Boucherie | 264/250 |
| 6,066,282 | A | * | 5/2000 | Kramer | 264/251 |
| 6,195,830 | B1 | * | 3/2001 | Bruschi | 15/143.1 |
| 6,276,019 | B1 | * | 8/2001 | Leversby et al. | 15/167.1 |
| 6,276,020 | B1 | * | 8/2001 | Leversby et al. | 15/167.1 |
| 6,372,162 | B1 | * | 4/2002 | Szczech | 264/40.5 |
| 6,464,920 | B1 | * | 10/2002 | Kramer | 264/243 |
| 6,641,764 | B2 | * | 11/2003 | Lanvers | 264/157 |
| 6,695,414 | B2 | * | 2/2004 | Meyer et al. | 300/21 |

* cited by examiner

Primary Examiner—Angela Ortiz
(74) Attorney, Agent, or Firm—Darby & Darby

(57) ABSTRACT

The present invention relates to a method of producing thick-walled brushes, in particular toothbrushes, with a grip piece and a brush head supporting bristle filaments. In order to increase the productivity, the method mentioned at the start is further developed by the present invention in that a core produced in a first injection molding cycle is coated with a plastic component in at least one subsequent injection molding cycle so as to form a multi-layered grip piece.

7 Claims, 1 Drawing Sheet

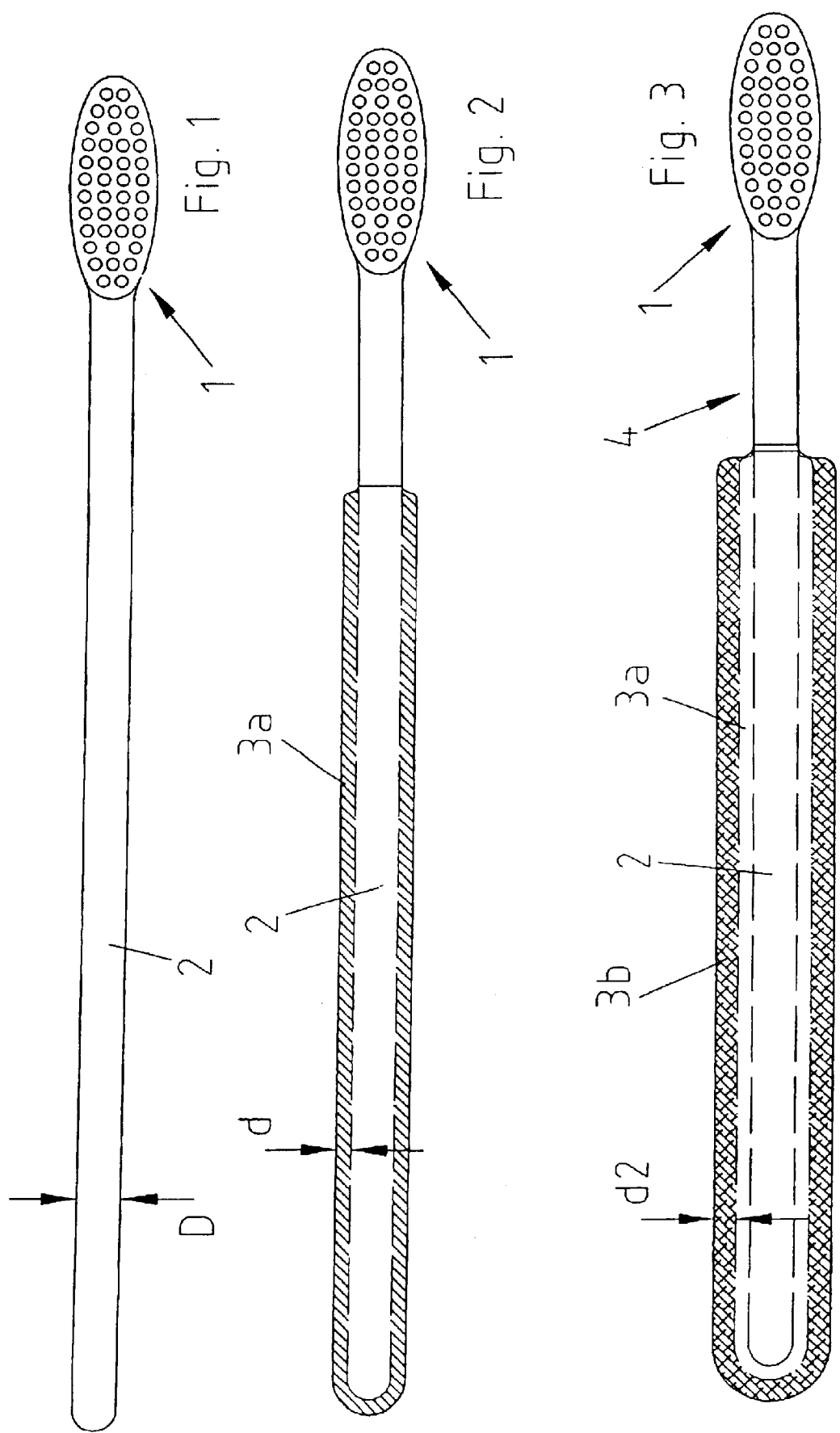

METHOD OF PRODUCING THICK-WALLED BRUSHES, IN PARTICULAR TOOTHBRUSHES

This is a continuation of international application Ser. No. PCT/EP01/08204, filed Jul. 17, 2001, the entire disclosure of which is hereby incorporated by reference.

BACKGROUND OF THE INVENTION

1. Field of the Invention

The present invention relates to a method of producing thick-walled brushes, in particular toothbrushes. Specifically, the present invention relates to a method of producing brushes with a grip piece and a brush head supporting bristle filaments.

2. Description of the Prior Art

Brushes, such as toothbrushes are normally produced by means of injection molding. It is known to form the grip piece with a basic body from a hard component around which a soft component is partially injection molded so as to form gripping areas with the aid of which the brush can be held safely. Injection molding around of a soft component is conducted in a subsequent injection molding cycle by injection molding plastic material into a die cavity which is larger than the die cavity for producing the basic body.

Under the aspect of good haptic properties, a grip piece having sufficiently large dimensions is demanded for brushes, in particular toothbrushes. Children and physically handicapped persons are hardly able to handle brushes having a comparatively thin grip piece safely. With regard to the shortest possible cycle time in the injection molding production process of the brushes, the grip piece should, however, preferably be implemented with walls which are as thin as possible. In the case of thin-walled grip pieces, short cooling and consolidation times can be achieved, without causing surface defects on the injection-molded component. The productivity is therefore high and the quality of the product is good.

SUMMARY OF THE INVENTION

It is the object of the present invention to provide a method of producing brushes by means of which comparatively thick-walled brushes having a good surface quality can be produced with high productivity.

The method suggested by the present invention for achieving the above object is disclosed in claim 1. According to the inventive method, a core produced in a first injection molding cycle is coated with a plastic component in at least one subsequent injection molding cycle so as to form a multi-layered grip piece.

In accordance with the method according to the present invention, the grip piece of the brush is produced in a plurality of successive injection molding cycles. In contrast to the known prior art, where the basic body is formed in a single injection molding cycle, said basic body being, if necessary, encompassed with a soft component in a subsequent injection molding cycle, this method permits the formation of grip pieces including a basic body with comparatively short consolidation and cooling times. The expenditure which is necessary for transferring the core to another, larger die cavity of an injection mold so as to encompass the core with another layer is justified by the fact that the cooling and consolidation times are, in total, short and by the good surface quality of the finished product.

In accordance with a preferred further development of the method according to the present invention, the times between injection of the plastic material and cooling to a temperature permitting the component in question to be removed from the mold in a dimensionally stable form are approximately equal, preferably identical, for the formation of the core on the one hand and for the formation of the coating produced in the subsequent injection molding cycle on the other. In accordance with this preferred further development, both the core and the coating are produced in the same injection molding die. It follows that the formation of the core on the one hand and the formation of a coating over the core, which has been produced in the preceding cycle, on the other hand take place in a single injection molding cycle in the same mold. The dimensioning of the core on the one hand and of the coating on the other permits the two parts of the brush to be formed within identical periods of time with identical cycle times. In the case of this preferred further development of the method according to the present invention, a thick-walled brush can be produced within the shortest possible time by means of injection molding.

According to a preferred embodiment of the method according to the present invention, the core with a grip-handle core, the neck area and the brush head are formed in the first injection molding cycle. The subsequent injection molding cycle exclusively serves to form an outer cover which fully encloses the circumferential surface of the grip-handle core. In this case, the cycle time for the first injection molding cycle is determined by the shape and by the dimensions of the brush head and of the grip handle, respectively. The dimensions of the grip-handle core are chosen such that, when a cooling time has elapsed which permits the brush head and/or the neck area to be removed from the mold in a dimensionally stable form, also the grip handle will have cooled down to such an extent that it constitutes a dimensionally stable component. Only in the subsequent injection molding cycle will the grip handle be given the dimensions and the shape of the final product in that it is coated with a plastic component. When the grip handles in question are particularly thick, it is possible to provide, in addition to a subsequent injection molding cycle for covering the grip-handle core, a further injection molding cycle in which a further layer is formed, which fully encompasses the circumference of the grip-handle core. Also this further layer can be produced in the same injection molding die. For observing production times which are as short as possible, it is of essential importance that the respective thicknesses of the layers and of the core produced in a single injection molding cycle permit an almost identical cycle time for forming all the subareas of the brush.

A particularly inexpensive embodiment is provided by forming the core from an inexpensive plastic material, especially a recycled plastic material, and by encompassing, in a further injection molding cycle, the outer cover enclosing the grip-handle core. The material used for encompassing said outer cover in a further injection molding cycle is preferably a high-quality plastic material, in particular a hard component, containing no recycled plastic material or only a small percentage of a recycled plastic material. The saving of costs achieved by the use of inexpensive plastic materials is improved still further in that a recycled plastic material is also used in the first injection molding cycle. Only the material used for encompassing the grip-handle core or the whole brush body in said further injection molding cycle should consist of a high-quality plastic material containing a low percentage of a recycled plastic material or no recycled plastic material at all, so as to provide a brush with good surface properties.

The multi-layered basic body of the grip piece produced by the method according to the present invention can, in a further method step, be injection molded around with a soft-elastic component for providing gripping sections as is generally known from the prior art.

The core of the grip handle is preferably formed of an inexpensive plastic material, in particular a recycled plastic material. This core may well have surface defects so that it will especially be possible to choose cooling and consolidation times for the injection-molded core which are shorter than those required for the formation of a perfect injection-molded article having good surface qualities. By means of this measure, the productivity is increased without impairing the surface quality of the finished grip piece.

According to another preferred further development of the method according to the present invention, the outer surface of the core and/or of an intermediate product, which consists of a core coated with one or with several layers, is decorated prior to the application of a first or of an additional layer of plastic material. Subsequently, this decorated outer surface is coated with a transparent plastic component. Making use of this preferred embodiment of the inventive method, the basic body can have formed thereon a lettering or two- or three-dimensional decorations without impairing the smooth surface of the grip piece which is to be preferred from a hygienic point of view. The outer surface of the core or of the intermediate product is decorated preferably by means of hot-process embossing.

It turned out that a layer whose thickness is in the range of from 15 to 50% of the thickness of the core and of the intermediate product, respectively, can be applied with comparatively short consolidation and cooling times. On the basis of this preferred embodiment of the inventive method, a short cycle time can be realized.

DESCRIPTION OF THE DRAWINGS

Further details, advantages and features of the present invention can be seen from the description of an embodiment following hereinbelow, in combination with the drawing, in which a toothbrush is shown in the successive steps of a production method. The individual figures show:

FIG. 1 a top view of the product of a first injection molding cycle;

FIG. 2 the product of a second injection molding cycle, and

FIG. 3 the product of a third and final injection molding cycle for producing a toothbrush.

DETAILED DESCRIPTION OF THE PREFERRED EMBODIMENTS

The product of a first injection molding cycle shown in FIG. 1 is produced in a die cavity of an injection mold die by injecting a hard component. The die cavity comprises a head-side cavity for forming a brush head 1 and a cavity arranged behind said head-side cavity and used for forming a core 2. The rear cavity communicates with the front cavity and has a substantially cylindrical cross-section. The core has a thickness D.

The intermediate product shown in FIG. 1 is transferred to a second die cavity of the same or of another injection molding die, as is generally known from the prior art in the case of methods in which a basic body produced in a first injection molding cycle is encompassed by injection molding with a thermoplastic elastomer so as to form functional gripping areas.

This second die cavity comprises a front cavity which is identical with the front cavity of the first die cavity and which accommodates the brush head 1 and a neck area 4, whereas the rear cavity, which also communicates with the front cavity, is larger than the rear cavity of the first die cavity. In this second, rear cavity, the core 2 is arranged such that its circumference is spaced from the wall of the rear cavity. Also the end face of the core 2 is spaced from the wall of the rear cavity. In a second injection molding cycle, a hard component is injected into the gap formed between the rear cavity and the outer circumferential surface of the core 2. The whole circumference of the core 2 is in this way coated with an injected component of plastic material. After this second injection molding cycle, the grip handle comprises a core 2 covered with a first layer 3a (FIG. 2).

The first layer 3a has a thickness d, said thickness d ranging preferably from 15 to 50% of the thickness D of said core 2. It turned out that particularly short cooling and consolidation times can be achieved, when the method is executed in this way.

The intermediate product shown in FIG. 2 is preferably decorated in a further method step. In so doing, the outer circumferential surface of the first layer 3a has applied thereto, preferably by means of hot-process embossing, a decoration and/or a lettering, which indicates e.g. the brand name of the product. The intermediate product treated in this way is transferred to a third die cavity comprising a front cavity, which accommodates the brush head 1 and the neck area 4 and which is identical with the corresponding cavities of the first and second die cavities, and a rear cavity, which circumferentially encompasses the outer circumferential surface of the first layer 3a at a constant distance therefrom. In a third injection molding cycle, a transparent hard component is injected into the resultant gap in accordance with the present method. This outer transparent layer surrounding the decoration is formed with a thickness $d_2$, which corresponds in the present case to approx. 40% of the thickness of the core plus twice the thickness of the first layer d. It follows that the thickness $d_2$ of the second layer 3b corresponds to approx. 40% of the thickness of the intermediate product according to FIG. 2.

The product shown in FIG. 3 is removed from the mold and subjected e.g. to a bristle-forming step in which openings formed in the brush head 1 are provided with bristle bundles. In the case of the present embodiment, a finished toothbrush is obtained in this way.

The finished product comprises a brush head 1 provided with bristle bundles, and a comparatively slender neck 4 following said brush head 1. The grip piece is comparatively thick and permits easy handling of the finished brush. The brush can be produced with comparatively short cooling and consolidation times, the surface quality of the grip piece being determined by the surface of the second layer alone. This second layer covers two-or three-dimensional decorations on the outer circumferential surface of the first layer 3a as well as possible faults which may perhaps exist on the core 2 and/or on said first layer 3a due to a fast removal from the mold before the end of a consolidation and cooling period which would be necessary for a perfect surface quality.

List of Reference Numerals 1. brush head
2. core
3a first layer
3b second layer 4 neck area
D thickness of the core
d thickness of the first layer
d₂ thickness of the second layer

What is claimed is:

1. A method of producing brushes with a grip piece and a brush head for supporting bristle filaments, comprising the steps of:
    initially producing a unitary basic body of a hard plastic material including a grip-handle core, a neck area and a brush head in a first injection molding cycle in a first die cavity,
    transferring said basic body to a larger die cavity, and
    circumferentially surrounding the grip-handle core with a cover layer of a hard plastic material in a subsequent injection molding cycle to form a multi-layered grip piece of hard plastic material wherein the grip-handle core and the hard plastic material layered on top of the circumference of the grip-handle core in the subsequent injection molding cycle are dimensioned such that the times between injection and cooling to a temperature to permit the basic body and the basic body with the layer on the grip-handle core to be removed from the respective mold in a dimensionally stable form are approximately equal for the formation of the grip-handle core and for the formation of the basic body with the layer of hard plastic material on the grip-handle core,
    wherein the layer of hard plastic material applied on the grip-handle core has a thickness in the range from 15–50% of the thickness of the grip-handle core, and wherein in a further injection molding cycle, the cover layer enclosing the grid-handle core is encompassed by another layer of plastic material formed by injection molding.

2. A method according to claim 1, wherein the cover layer on the grip-handle core is formed of a recycled plastic material.

3. A method according to claim 1, wherein the grip-handle core is formed of a recycled plastic material.

4. A method according to claim 1, further comprising the step of decorating the outer surface of the grip-handle core and/or of an intermediate product prior to the application of the grip-handle core cover layer, and wherein the grip-handle core cover layer is of a transparent-plastic material.

5. A method accord to claim 4, wherein the decorating of the grip-handle core is carried out by hot-process embossing.

6. A method according to claim 4, wherein the layer of plastic material applied as the grip-handle core cover layer has a thickness in the range of from 15 to 50% of the thickness of the grip handle core and/or of the intermediate product before application of the grip-handle core cover layer.

7. A method according to claim 1, wherein the grip-handle core and at least one layer of the grip handle cover layer are formed of identical materials.

* * * * *